Jan. 29, 1952 E. T. JAYNES 2,583,573

RADIO RECEIVING SYSTEM

Filed Nov. 21, 1945

INVENTOR
EDWIN T. JAYNES
BY Paul B. Hunter
ATTORNEY

Patented Jan. 29, 1952 2,583,573

UNITED STATES PATENT OFFICE 2,583,573

RADIO RECEIVING SYSTEM

Edwin T. Jaynes, Washington, D. C., assignor to The Sperry Corporation, a corporation of Delaware Application November 21, 1945, Serial No. 629,993

11 Claims. (Cl. 343—8)

This invention relates generally to radio transmission and reception and more particularly to a method and apparatus for improving the signal to noise ratio in a carrier and single sideband receiving system.

The most familiar mode of transmitting information by radio waves is by varying the amplitude of a radiated wave in accordance with the intelligence to be communicated. It is well known that an amplitude modulated wave consists of a carrier wave and two groups of waves called upper and lower sidebands composed of frequencies which are respectively greater and less than the frequency of the carrier wave by the corresponding frequencies contained in the original modulating signal. Each sideband independently conveys all the information present in the modulated wave, and each contributes equally, upon the reception and demodulation of such a modulated wave, to the power of the reproduced signal.

It is thus possible and often desirable to eliminate one of the sidebands from the radiated wave in order to reduce to substantially a half the frequency band occupied by the radio channel. This conserves valuable space in the limited frequency spectrum available for a particular type of radio service. In other services, especially in radio locator or radar systems employing the Doppler principle for distinguishing between moving and stationary objects, only waves equivalent to a carrier and a single sideband are available for reception.

It is seen that prior to the present invention the elimination or absence of one sideband resulted in a reduction in the signal power output of a receiver to half that obtainable from the same receiver when both sidebands were present with equal amplitudes. Under certain conditions this reduction in power may be compensated for by an increase in the power of the transmitter. This, however, is a costly and often a difficult expedient. Additional amplification in the receiver is often an unsatisfactory solution because random noise generated in the receiver input circuits is amplified in like proportion to the desired signals. As a result there is no improvement in the signal to noise ratio. This lowered signal to noise ratio is a particularly serious matter in radar systems since the energy reflected back by an object such as an aircraft flying at a distance from the radar receiver is of minute intensity and comparable to the random noise in the receiver.

The principal object, therefore, of the present invention is to provide a novel method and simple apparatus for improving the signal to noise ratio in a carrier and single sideband receiving system.

Another object is to provide apparatus that is adapted to convert a combined amplitude and phase modulated wave into a conventional amplitude modulated wave and yet is substantially insensitive to the normal frequency drifts of the received waves.

Still another object is to reduce harmonic signal distortion resulting from employing a linear detector in a carrier and single sideband receiving system.

A further object in the invention is to provide improved apparatus and instrumentalities embodying novel features and principles adapted for use in realizing the above objects and also applicable in other fields.

The invention, in another of its aspects, relates to novel features of the instrumentalities described herein for achieving the principal object of the invention and to novel principles employed in those instrumentalities irrespective of whether these features and principles are used for said principal object or in said field.

Another feature of the invention is the provision of a dual source of local oscillations in a radio receiver adapted to receive a carrier wave and a single sideband wave for the purpose of converting the received waves to an amplitude modulated intermediate frequency wave having double sidebands.

A further feature lies in the provision in a carrier and single sideband receiving system of a dual local oscillator for supplying two frequencies in the form of sum and difference frequencies resulting from the modulation of the carrier wave by a wave of stable intermediate frequency generated at the receiver, thus insuring that the local oscillations are precisely synchronized with the received waves.

Generally speaking, the present invention contemplates effecting an improvement in the signal to noise ratio in a carrier and single sideband receiving system by generating two waves having frequencies higher and lower than the frequency of the carrier wave by precisely the same predetermined intermediate frequency, beating the generated and received waves together to obtain an amplitude modulated intermediate frequency wave having double sidebands, and then demodulating this intermediate frequency wave to reproduce a signal having twice the power of that obtainable from the same superheterodyne receiver when employing a conventional single frequency local oscillator.

In superheterodyne receiving systems where there is no radio frequency amplification before the mixer or frequency converter and substantially all the receiver noise is contributed by the first stage of the intermediate frequency amplifier, almost 3 db improvement in the ratio of signal to noise powers is achieved by the employment of two synchronized local oscillator waves. It is well known that the detrimental effect of a particular source of noise is inversely proportional to the gain of the receiver preceding such source. As a consequence the actual improvement to be anticipated upon incorporating the present invention in a particular receiving system is dependent upon the intensity of the random noise produced in or preceding the frequency converter relative to the intensity of the noise produced in the subsequent circuits.

The invention will be more fully understood after reference to the specific embodiment illustrated in the drawing and to the following description thereof.

Figures 1, 2, 3, 4:
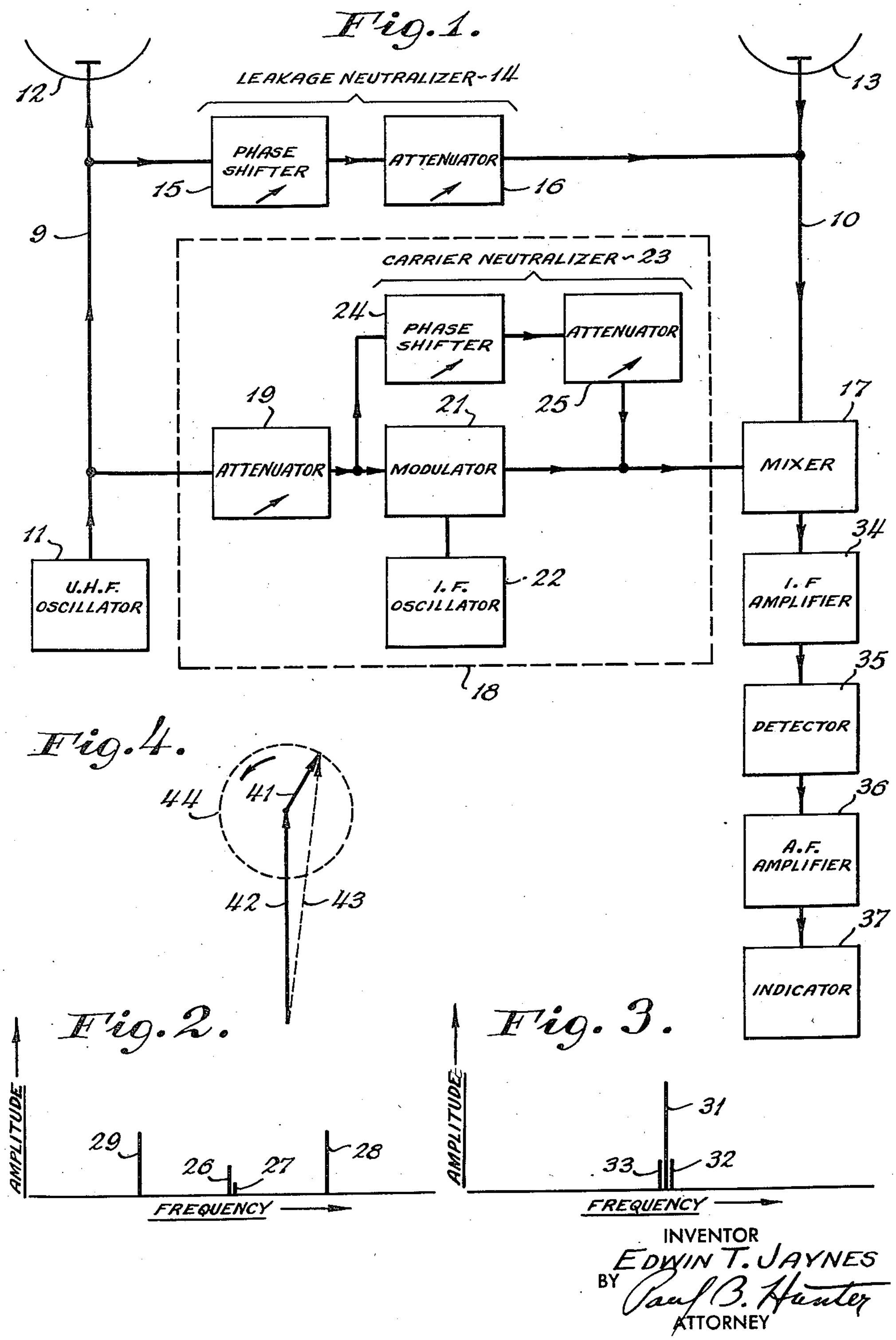
Fig. 1 is a block diagram of a continuous wave object detection or radar system embodying one form of the inventive apparatus.
Figs. 2 and 3 are graphs illustrating typical radio frequency and intermediate frequency spectra, respectively, arising in the radar system of Fig. 1 and useful in explaining the operation of the invention.
Fig. 4 is a vector diagram illustrating a carrier and single sideband wave.

A radio locator or radar system has been chosen to illustrate an embodiment of the present invention since not only are signal to noise improvements most welcome in such systems, but also the inventive apparatus comprises a clever rearrangement of circuits adding little to the complexity of the system.

The radar system shown in Fig. 1 operates on the well-known principle that when a reflecting object has a component of velocity relative to a radio transmitter, that portion of the intercepted radiant energy which is returned toward the source of radiation differs in frequency from the transmitted energy. This phenomenon is commonly called the Doppler effect. The frequency difference between the radiated and reflected waves is directly proportional to both the radial velocity of the object and the frequency of the transmitted wave. The relationship between these waves is one of carrier and sideband, the sideband lying above the carrier frequency when the distance between the object and the receiver is decreasing and below this frequency when the distance is increasing. The radiated and reflected waves may be mixed in a detector to produce a beat frequency signal or Doppler beat note revealing the presence of the moving object. The frequency of this signal may then be measured to provide an accurate knowledge of the radial velocity of the object. Various means have been proposed for determining the distance to the object but these means fall outside the scope of the present invention.

Referring now to Fig. 1, an ultra high frequency oscillator 11 produces a radio wave of substantially constant frequency and amplitude, the major portion of which is provided over a line 9, representing, say, a wave guide, to a radiator or antenna 12 for radiation into space. Radiator 12 is preferably directive for concentrating transmitted energy in a limited zone.

Some of the radiated energy is reflected by any moving object present while other portions are returned towards the transmitter after having been scattered by the ground or other substantially stationary objects. A receiving antenna or wave collector 13 placed near but not necessarily next to radiator or antenna 12 may be similar to the latter and is adapted to collect a part of the reflected energy and impress it on a line 10 similar to line 9. There is also a certain amount of radiant energy leaking directly from the radiator 12 to the receiving antenna 13. A leakage neutralizer 14 comprising an adjustable phase shifter 15 and an adjustable attenuator 16 is provided between lines 9 and 10 to substantially neutralize the constant radiation coupling between antennas 12 and 13.

The waves collected by antenna 13 are supplied over the line 10 to a mixer 17 for the purpose of converting the frequencies of the incoming waves to intermediate frequencies more readily amplified. To accomplish this frequency conversion, not one but two unmodulated local oscillator frequencies are supplied concurrently to the mixer 17. These two local oscillator frequencies differ from the carrier component of the received waves by precisely the same predetermined intermediate frequency irrespective of normal drifts in the carrier frequency. The local oscillator frequencies are derived from a dual local oscillator comprising the structure included within the dashed line 18 and discussed immediately below.

An adjustable attenuator 19 provides a small amount of energy from the ultra high frequency oscillator 11 to a modulator or mixer 21. Modulator 21 is also fed a wave of a suitable intermediate frequency or submultiple thereof from an intermediate frequency oscillator 22. The output of modulator 21 contains frequencies equal to the carrier and a plurality of sideband frequencies differing from the carrier frequency by multiples of the intermediate frequency. A carrier neutralizer 23 in the form of an adjustable attenuator 25 and phase shifter 24 is provided between the attenuator 19 and the output of the modulator 21 to permit substantial neutralization or cancellation of the carrier wave in the modulator output circuit.

The output circuit of modulator 21 is coupled to the mixer 17 and as a result two local oscillator waves are made available in the mixer 17 at precisely the frequencies required to heterodyne with the two received radio waves that correspond to a phase and amplitude modulated wave and to create three intermediate frequency waves that correspond to a pure amplitude modulated wave.

Considering only those frequencies produced by mixer 17 that lie in the neighborhood of the intermediate frequency, it will be seen that each local oscillator wave beats with the carrier wave to produce a single resultant intermediate frequency carrier wave, while the local oscillator waves beat with the single sideband to create both upper and lower intermediate frequency sidebands, thus forming a symmetrical amplitude modulated intermediate frequency wave.

Fig. 2 illustrates a typical frequency spectrum of the waves impressed on mixer or frequency converter 17. Upper and lower local oscillator waves 28 and 29, respectively, are displaced above and below a carrier wave 26 by precisely the same intermediate frequency. A sideband 27 is shown displaced above the carrier 26 indicating that the moving object which caused the frequency shift is approaching the radar system. The radial velocity of approach is measured by the audio frequency displacement between waves 26 and 27.

Fig. 3 illustrates those frequencies resulting from the beating together of the waves shown in Fig. 2. Radio frequency carrier wave 26 beats with both upper and lower local oscillator waves 28 and 29, respectively, to produce two wave components of identical frequency which add vectorially according to their phase angles to produce a resultant intermediate frequency carrier wave 31. The heterodyning of radio frequency sideband 27 with upper local oscillator wave 28 creates a difference frequency corresponding to a lower intermediate frequency sideband 33 displaced from the intermediate frequency carrier wave 31 an amount equal to the separation of radio frequency waves 26 and 27. In a similar manner sideband 27 beats with the lower local oscillator wave 29 to create a difference frequency corresponding to an upper intermediate frequency sideband 32 separated from the intermediate frequency carrier 31 an amount equal to the displacement of the lower sideband 33 but in the opposite direction. Mathematical analysis can readily show that the phase relationships between waves 31, 32 and 33 are the same as in pure amplitude modulation and experience has verified this analysis.

Returning now to Fig. 1, a conventional amplitude modulated intermediate frequency wave is seen to be present in the output circuit of mixer 17 which is coupled to an intermediate frequency amplifier 34. After amplification in amplifier 34, the modulated wave is supplied to an amplitude modulation detector 35. The Doppler beat note resulting from the moving object is reproduced from the wave envelope. As a result of the addition to the intermediate frequency wave of the sideband missing from the radio waves, the detected signal has twice the power that it otherwise would have. In a radar system such as the one described, the improvement in the signal to noise ratio is almost as great as the gain in signal strength.

The beat note or detected signal is amplified in an audio frequency amplifier 36 and supplied to an indicator 37 which may take the form of a frequency meter adapted to indicate not only the presence but also the radial velocity of the moving object.

The incorporation of the dual local oscillator 18 in such a radar system as the one described above, not only increases by almost a fifth the theoretical maximum range at which the system is sensitive to objects, but it also reduces interference created in prior systems by slowly moving or oscillating objects, such as swaying trees, close to the receiver. The frequency shifts of the carrier wave caused by such objects are rather slight so that the Doppler beat notes resulting therefrom are low. Interference arising from this source is substantially eliminated from the present apparatus by designing the audio amplifier 36 to have a low gain at these frequencies.

Prior to the present invention, discrimination against Doppler beat notes caused by such slowly moving nearby objects was not completely effective in overcoming this type of interference because harmonics of the beat notes were created by the detector in the radar receiver. The harmonic waves could not be suppressed by a filter without removing signals of comparable frequency corresponding to some of the moving objects whose presence it was desired to indicate. These harmonic waves arose as a result of the following conditions. A radar system operating in the vicinity of natural obstructions collects such a large amount of energy scattered by nearby objects that the detector always works on a substantially linear portion of its operating characteristic. A linear detector, as is well known, responds to the shape of the wave envelope and therefore is sensitive to any distortion thereof. Distortion is always present in the envelope of a combined carrier and single sideband wave as will be explained with reference to Fig. 4.

In Fig. 4, a vector 41 representing a sideband wave is shown as rotating at a frequency equal to the difference between the sideband and its carrier wave about the tip of a vector 42 representing the carrier wave. A dashed line 43 connecting the base of the carrier wave vector 42 with the tip of the sideband vector 41 represents the resultant modulated wave at a given instant. The extremity of the modulated wave vector 43 sweeps out a circle 44 having a radius equal to the sideband wave vector. It is evident that not only does the modulated wave vector periodically increase and decrease in amplitude, but it also periodically varies in phase relative to the carrier wave vector. The phase modulation of the modulated wave prevents the amplitude from varying in a purely sinusoidal manner, and thus a linear detector responsive to envelope shape produces harmonics not present in the original modulating signal.

The present system, on the other hand, adds a second sideband to the modulated wave through the action of the dual local oscillator 18. This second sideband is equal in amplitude to the original sideband, and a vector representing the same rotates at the same frequency but in a direction opposite to that of the vector 41 in Fig. 4. The additional sideband added to the first cancels all phase modulation in the incoming waves leaving only pure amplitude modulation. Since the intermediate frequency wave envelope is sinusoidal insofar as each discrete radio side frequency is concerned, the detector 35, if perfectly linear, reproduces only those frequencies that correspond to the Doppler shifts in the carrier frequency caused by moving objects. The beat notes due to interfering objects lie below the frequency band amplified by amplifier 36 and thus the indicator 37 in the present system is appreciably more free from interference than prior indicators.

The present invention has been described in conjunction with a simplified form of radar system in order not to obscure the inventive principles by the disclosure of patentably unrelated system refinements. However, the advantages of the inventive method are present, for example, in a radar system wherein reception is so synchronized with transmission that the receiving system is only responsive during the quiescent periods between periodic transmissions, thus permitting alternate use of a common antenna as radiator and wave collector. Likewise, the receiving system may have indicating circuits adapted to reveal the distance to the moving object. The sensitivity and effectiveness of all such modified systems is substantially improved by incorporating the teachings of the present invention.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An oscillator for generating a radio carrier wave, means for radiating said wave toward a distant object having relative motion to the oscillator to cause said wave to be reflected therefrom, means for receiving said reflected wave from the distant object and for receiving a version of said radio carrier wave, means for generating two waves having frequencies equally displaced above and below the frequency of said carrier wave, a mixer for heterodyning the received waves with said two waves to obtain an amplitude modulated wave, and means for amplifying and demodulating said amplitude modulated wave.

2. In a radar system, an oscillator for generating an ultra high frequency wave, means for radiating said wave into space, means for receiving said wave after reflection from an object having motion relative to the radar system whereby the frequency of said reflected wave is shifted relative to that of said radiated wave, means for generating two waves having frequencies equally displaced higher and lower than the frequency of said radiated wave, a frequency converter for heterodyning said reflected wave, said ultra high frequency wave and said two frequency displaced waves to obtain an amplitude modulated intermediate frequency wave, and means for amplifying and demodulating said intermediate frequency wave to determine said frequency shift due to said relative motion.

3. In a radio transmission system, an oscillator for generating a radio frequency carrier wave, means for providing a wave differing in frequency from said carrier wave by a signal frequency, a receiver for receiving said waves, a source of waves harmonically related to an intermediate frequency, means for modulating said carrier wave with waves from said source to obtain a sum and a difference frequency wave of higher and lower frequency than said carrier wave and differing therefrom by said intermediate frequency, means for beating said sum and difference frequency waves and said received waves to obtain an intermediate frequency wave amplitude modulated by said signal and means for amplifying and demodulating said intermediate frequency wave to reproduce said signal.

4. In a radar system, an oscillator for generating an ultra high frequency wave, means for radiating said wave into space, means for receiving said wave after reflection from an object having motion relative to the radar system whereby the frequency of said reflected wave is shifted relative to that of said radiated wave, a source of waves harmonically related to an intermediate frequency, means for modulating said ultra high frequency wave with waves from said source to obtain a sum and a difference frequency wave of higher and lower frequency, respectively, than said ultra high frequency wave and differing therefrom by said intermediate frequency, means for beating said ultra high frequency wave, said reflected wave, and said sum and difference frequency waves to obtain an amplitude modulated intermediate frequency wave, and means for amplifying and demodulating said intermediate frequency wave to determine said frequency shift resulting from said relative motion.

5. In a radio receiving system, a wave collector for receiving a carrier wave and a sideband wave differing in frequency by the periodicity of a signal, a source of an intermediate frequency wave, a modulator for modulating said carrier wave with said intermediate frequency wave to generate a sum and a difference frequency wave of higher and lower frequency, respectively, than said carrier wave and differing therefrom by said intermediate frequency, a frequency converter for beating said carrier, sideband, sum and difference frequency waves together to produce an amplitude modulated intermediate frequency wave, and means for amplifying and demodulating said modulated intermediate frequency wave to reproduce said signal.

6. In a radio system adapted to receive a wave having a carrier and single sideband frequencies and for converting the same into an amplitude modulated wave having double sidebands, a superheterodyne receiver comprising, a mixer, an intermediate frequency amplifier coupled to the output of said mixer, a detector coupled to the output of said amplifier, and means coupled to said mixer for providing a first and a second local oscillation, said first and second local oscillations being supplied concurrently to said mixer, and said second local oscillation differing from the frequency of said carrier by an amount equal and opposite in sense to the frequency difference between said first local oscillation and said carrier.

7. In a radio receiving system, means for collecting a wave having a carrier and single sideband frequencies, said carrier and said sideband differing by the frequency of a signal, means for generating two waves having substantially constant characteristics, said waves having frequencies equally displaced above and below the frequency of the carrier, means coupled to said generating means for heterodyning said collected wave with said two generated waves to produce an amplitude modulated wave, and means coupled to said heterodyning means to receive said amplitude modulated wave for amplifying and demodulating the same.

8. An oscillator for generating a radio carrier wave, means for radiating said wave toward a distant object having relative motion to the oscillator to cause said wave to be reflected therefrom, means for receiving said reflected wave from the distant object and for receiving a version of the carrier wave, means for generating two waves having frequencies equally displaced above and below the frequency of said carrier wave by an intermediate frequency, a frequency converter for beating said received waves with said two generated waves to produce an amplitude modulated intermediate frequency wave, and means for amplifying and demodulating said intermediate frequency wave.

9. In an indicating system for indicating the presence and velocity of a moving object, the combination of wave collecting means for receiving a version of a radio wave having a Doppler component reflected by said moving object, means for generating two local oscillations having frequencies equally displaced above and below the carrier frequency of said radio wave, means coupled to said generating means for heterodyning said two local oscillations concurrently with said received radio wave to obtain an amplitude modulated wave, means coupled to said heterodyning means for amplifying and demodulating said amplitude modulated wave, and means coupled to said last-mentioned means to receive the demodulated signal therefrom for indicating the presence and velocity of said moving object.

10. A superheterodyne system for receiving a version of radio carrier wave having a Doppler component differing in frequency from the frequency of said carrier by the periodicity of a signal comprising, a mixer, an intermediate frequency amplifier coupled to said mixer, a detector coupled to said amplifier, and means coupled to said mixer for generating first and second local oscillations, said first and second local oscillations being concurrently supplied to said mixer, said second local oscillation frequency differing from said carrier frequency by an amount equal to but opposite in sense to the frequency difference between said first local oscillation and said carrier.

11. A receiving system for converting a received wave having an angle modulated component into an amplitude modulated wave having double sidebands comprising, means for generating concurrent first and second local oscillations having frequencies equally displaced above and below the carrier frequency of said received wave, a mixer coupled to said generating means for heterodyning the received wave with said first and second local oscillations, and means coupled to said mixer to receive the output therefrom for amplifying and demodulating resultant amplitude modulated wave.

EDWIN T. JAYNES.

REFERENCES CITED

The following references are of record in the file of this patent:

UNITED STATES PATENTS

| Number | Name | Date |
|---|---|---|
| 2,095,050 | Beverage | Oct. 5, 1937 |
| 2,256,199 | Hansell | Sept. 16, 1941 |
| 2,273,023 | Bellescize | Feb. 17, 1942 |
| 2,419,984 | Boothroyd | May 6, 1947 |

FOREIGN PATENTS

| Number | Country | Date |
|---|---|---|
| 471,610 | Great Britain | Sept. 8, 1937 |